(12) United States Patent
Guillou et al.

(10) Patent No.: US 8,211,702 B2
(45) Date of Patent: Jul. 3, 2012

(54) METHOD FOR LABELLING A MATERIAL COMPRISING AT LEAST ONE NON-ORGANIC MATRIX AND CORRESPONDING MATERIAL

(75) Inventors: Olivier Guillou, Cesson-Sevigne (FR); Carole Daiguebonne, Cesson-Sevigne (FR); Nicolas Kerbellec, Pontivy (FR)

(73) Assignee: Institut National des Sciences Appliquees de Rennes, Rennes Cedex (FR)

( * ) Notice: Subject to any disclaimer, the term of this patent is extended or adjusted under 35 U.S.C. 154(b) by 406 days.

(21) Appl. No.: 12/440,734

(22) PCT Filed: Sep. 20, 2007

(86) PCT No.: PCT/EP2007/059946
§ 371 (c)(1),
(2), (4) Date: Nov. 17, 2009

(87) PCT Pub. No.: WO2008/034865
PCT Pub. Date: Mar. 27, 2008

(65) Prior Publication Data
US 2010/0108961 A1 May 6, 2010

(30) Foreign Application Priority Data
Sep. 21, 2006 (FR) ...................................... 06 08294

(51) Int. Cl.
*G01N 35/08* (2006.01)

(52) U.S. Cl. ......................................... 436/56; 106/713
(58) Field of Classification Search .................... 436/56; 106/713
See application file for complete search history.

(56) References Cited

U.S. PATENT DOCUMENTS

| 5,756,224 | A | 5/1998 | Borner et al. |
| 6,515,113 | B2* | 2/2003 | Raymond et al. ............... 534/15 |
| 7,517,701 | B2* | 4/2009 | Parker et al. .................. 436/546 |
| 7,695,980 | B2* | 4/2010 | Heindl et al. ................. 436/546 |

FOREIGN PATENT DOCUMENTS

| DE | 19802588 A1 | 2/1998 |
| WO | 2004/039913 A2 | 5/2004 |
| WO | 2005/020194 A1 | 3/2005 |

* cited by examiner

*Primary Examiner* — Paul Marcantoni
(74) *Attorney, Agent, or Firm* — Thomas, Kayden, Horstemeyer & Risley, LLP

(57) ABSTRACT

The present invention relates to a method for marking at least one material comprising a non-organic matrix, characterized in that it comprises at least one step that involves incorporating in said material during the production thereof at least one compound containing at least one luminescent lanthanide in a concentration such that said compound in said material can be detected under UV radiation, wherein said compound is a co-ordination polymer in the form of a crystallite obtained by reacting at least one luminescent lanthanide ion with at least one unsaturated organic binder.

18 Claims, 4 Drawing Sheets

Luminescence spectra of compounds $Ln_2(C_8O_4H_4)_3(H_2O)_4$
where $Ln = Dy$, $Tb$ or $Eu$ Luminescence spectra of compounds $Ln_2(C_8O_4H_4)_3(H_2O)_4$ where $Ln = Dy$, $Tb$ or $Eu$

METHOD FOR LABELLING A MATERIAL COMPRISING AT LEAST ONE NON-ORGANIC MATRIX AND CORRESPONDING MATERIAL

CROSS REFERENCE TO RELATED APPLICATION

This application claims priority to "Method for Labelling A Material Comprising At Least One Non-Organic Matrix and Corresponding Material," having serial number PCT/EP2007/059946, filed on Sep. 20, 2007. This application also claims priority to and benefit of French Application entitled "Method for Labelling A Material Comprising At Least One Non-Organic Matrix and Corresponding Material", having Application No. 0608294, filed on Sep. 21, 2006, which is incorporated by reference in its entirety.

The field of the invention is that of material design and production.

More specifically, the invention relates to materials comprising a mineral matrix and especially, but not exclusively, fire-resistant building materials used for fire protection.

Recent disasters, particularly those of the Twin Towers in New York and the Mont Blanc tunnel in France, have raised awareness of the importance of the use of such fireproofing materials.

These materials which, in addition to a mineral matrix, contain various compounds including fire-retarding compounds, are more and more efficient.

The companies manufacturing and/or marketing said fireproofing materials for builders assume their responsibility regarding the damages that can result from the trial thereof. In this context, they must be able to prove, if required, that the material actually used by the builder for a given construction is indeed theirs or, the case arises, is not.

This problem may also arise for other types of mineral matrix materials than fireproofing materials, such as concretes used for highly technical constructions such as civil engineering works.

Therefore, there is a high requirement for enabling the organisation of the traceability of such mineral matrix materials.

In this context, the aim of the invention is to provide a technique for labelling materials based on at least one mineral matrix for their subsequent identification if required.

The aim of the invention is also to provide such a technique which keeps the properties of said material intact or practically intact.

A further aim of the invention is to provide such a technique which makes it possible to detect the labelling by means of simple techniques.

A further aim of the invention is to provide such a technique which is simple in design, easy and relatively inexpensive to implement.

These aims, along with others which will emerge hereinafter, are achieved by means of the invention which relates to a method for labelling at least one material comprising a mineral matrix characterised in that it comprises at least one step consisting in incorporating therein during the manufacture thereof at least one compound based on at least one luminescent lanthanide or at least one luminescent rare earth according to a concentration making said compound detectable under UV irradiation in said material, said compound being a coordination polymer in the form of a crystallite obtained by reacting at least one luminescent lanthanide ion or at least one luminescent rare earth ion with at least one unsaturated organic ligand.

Therefore, such compounds form markers enabling the labelling of any material based on a mineral matrix and enabling the subsequent identification of said material even after a long period of use.

Such markers offer a real interest for materials in that the use of lanthanide or rare earth ions is innovative in the field of construction and in that the presence thereof is easily detectable, using for example simply a lamp emitting ultraviolet radiations.

In addition, said compounds are sufficiently luminescent in UV to be able to be used in very low concentrations in order to be detected, by means of spectrophotometry or even, if the case arises, human eye. This makes it possible to limit the cost of the method, but also makes it possible not to modify the properties, particularly rheological, mechanical or thermal properties, of the material.

Moreover, they are resistant to high temperatures which makes them usable for the labelling of fire protection products.

They are also sufficiently chemically inert so that the introduction thereof in the matrix does not raise compatibility problems with other compounds present in the materials having a mineral matrix.

Moreover, these compounds are easy to detect in the context of a routine inspection, as they are luminescent in UV irradiation.

Finally, they offer the advantage of being invisible in the absence of UV radiation, once included in the material.

Lanthanides comprise lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), yterrbium (Ub) and lutetium (Lu) and the rare earths comprise these elements plus scandium (Sc) and yttrium (Y).

These rare earths are, contrary to their name, relatively widespread in the earth crust, equal to usual metals. They are, mostly, present simultaneously in ores such as bastanisite, monazite, loparite (niobiotitanate), apatite, xenotime (orthophosphate) and laterite clays.

In the elementary form, rare earths have a metallic appearance and are relatively soft, malleable and ductile.

The electron transitions for rare earths are located between discrete levels and this is conveyed by absorptions and emissions of light with highly monochromatic characteristics.

In terms of absorption, some trivalent rare earths make it possible to obtain very specific colours used in the glass and ceramics industry where rare earths are used in pigment composition.

With respect to emission, the applications have been developed, in conjunction with the industrial availability of rare earths at sufficient purities: colour television, fluorescent lighting and medical radiography. A wide variety of emission may be obtained according to the nature of the rare earth involved and the respective positions of the excited or fundamental energy levels. According to the lanthanide element selected, the light emission is located in the near ultraviolet (with gadolinium, cerium), the visible (red with europium, orange with samarium, green with terbium, yellow with dysprosium, blue with thulium) or the near infrared (with neodymium).

In this way, in colour television, the image is reproduced by means of the selective cathodic excitation of three luminophores (blue, green and red) based on lanthanides deposited on the inner face of the screen.

Preferentially, the compound based on luminescent lanthanide or luminescent rare earth used within the scope of the method according to the invention will be implemented in the material in concentrations selected so as to enable the identification thereof without burdening the production cost of the material excessively. In practice, these concentrations will advantageously be between 1 gram per tonne and 10 grams per tonne of mineral matrix.

Said concentrations being very low, said compound based on luminescent lanthanide or luminescent rare earth may advantageously be incorporated in said mineral matrix by successive dilutions.

Another solution, which may be used when the material comprises at least one additive such as for example:
setting retarding agent;
setting accelerator;
liquefier;
colorant,
will consist in incorporating said compound based on at least one luminescent lanthanide or at least one luminescent rare earth with at least one of said additives, and incorporating said mixture in said mineral matrix.

According to a very advantageous alternative embodiment of the invention, the method is used to label at least two samples of the same material comprising a mineral matrix characterised in that it comprises a step consisting of incorporating in each of said samples of said material during the manufacture or implementation thereof, a compound based on at least two distinct lanthanides or rare earths wherein at least one is luminescent according to a concentration making it detectable under UV irradiation, the lanthanide or rare earth percentages of the compound being distinct according to said samples.

It should be noted that, in such a method, simply one of the lanthanide ions or one of the rare earth ions must be luminescent.

In such a method, the compound having, according to the samples of the material, different lanthanide or rare earth percentages, will also have a different spectrophotometric signature according to said samples, which will make it possible to identify them easily.

Such an alternative embodiment will make it possible to distinguish between batches of a material having the same composition but manufactured on different production sites or on different dates or for different customers.

The invention also relates to any material comprising at least one mineral matrix, characterised in that it incorporates at least one luminescent marker consisting in a compound based on at least one lanthanide ion or at least one rare earth ion according to a concentration making said compound detectable under UV irradiation in said material, said compound being a coordination polymer in the form of a crystallite obtained by reacting at least one luminescent lanthanide ion or at least one luminescent rare earth ion and at least one unsaturated organic ligand.

Also preferentially, said lanthanide is selected in the group consisting of europium, terbium, homium, dysprosium, thulium, praseodymium, neodymium or erbium.

According to an advantageous alternative embodiment of the invention, said compound is based on at least one first luminescent lanthanide or luminescent rare earth and based on at least one second luminescent or non-luminescent lanthanide or rare earth.

Most preferentially, said compound is based on europium and/or terbium. Both luminescent lanthanides are those displaying the best quantum yield. Europium emits a red light and terbium a green light.

Advantageously, said unsaturated ligand is selected in the group consisting of phthalate, isophthalate, terephthalate, trimesate, trimellitate, pyromellitate, mellitate.

Preferentially, said unsaturated ligand is the terephthalate ion.

Most preferentially, the compound complies with the formula:

$$Ln_xLn'_y(C_8O_4H_4)_3(H_2O)_4 \text{ where } x+y=2$$

wherein, Ln and Ln', identical or different, represent two luminescent lanthanide ions or rare earth ions and $C_8O_4H_4$ a terephthalate radical.

Preferentially, said compound based on at least one luminescent lanthanide or a luminescent rare earth is included therein at a rate of 1 gram to 10 grams per tonne.

Also preferentially, said mineral matrix comprises calcium sulphate.

Other features and advantages of the invention will emerge more clearly with the description of embodiments thereof given with reference to the figures wherein.

PRODUCTION OF CRYSTALLITES BASED ON LANTHANIDES

To conduct the tests, compounds having a general chemical formula $Ln_2[TER]_3.4H_2O$ were produced, wherein:
Ln is either europium, terbium, dysprosium or erbium, and
"TER" represents a terephthalate(benzene-1,4-dicarboxylate) radical.

These compounds are coordination polymers in the form of crystallites.

They were obtained by placing an aqueous solution of a rare earth salt and an aqueous solution of a terephthalic acid salt ($H_2TER$) in direct contact according to the following procedure:
1 mmol of lanthanide chloride hexahydrate ($LnCl_3.6H_2O$) is dissolved in 20 ml of water;
1.5 mmol of sodium terephthalate ($Na_2TER$) is dissolved in 20 ml of water;
both clear solutions are mixed and kept under stirring, at ambient temperature, for 10 minutes; the precipitation of white microcrystalline solid starts instantaneously when the two solutions are placed in contact and continues for the 10 minutes of stirring;
the white precipitate is filtered, washed with water and air-dried.

The solids obtained, insoluble in water and the majority of organic solvents may be characterised by X-ray diffraction on powder. All these compounds are isostructural. For example, the solid obtained with terbium crystallised in the triclinical system (P-1 space group) with the following crystalline parameters: a=6.1420 (2)Å, b=10.06964 (1)Å, c=10.0956 (3)Å, α=102.247 (2)°, β=91.118 (1)°, γ=101.518 (2)° and Z=2.

The yield of the reaction is of the order of 80%.

The crystallites obtained are of a homogeneous sub-micronic size and have a wafer morphology.

The chemical strength of said compounds is also satisfactory in that lanthanide ions have an excellent affinity with the carboxylate groups of the ligands.

In this way, once formed, said compounds are not very sensitive to washes with acidic or basic solutions.

Moreover, they are stable in air for over one year.

Moreover, said compounds have a high thermal stability as tests have demonstrated that the molecular structure thereof was not destroyed at 500° C., i.e. they withstand temperatures considerably greater than temperatures of use.

Said compounds emit in the visible range under ultraviolet irradiation. The emission may be visible to human eye or observed by spectrophotometry.

The mechanism of this phenomenon is known as the antenna effect. Indeed, the irradiation in UV is performed at 254 nm, for example, the absorption wavelength of organic π systems such as those existing in benzene polycarboxylate type ligands.

The excitation energy is absorbed by the ligand, and transferred by means of non-radiation transfer to the lanthanide ion which is de-energised while emitting in the visible range.

Figure 1:
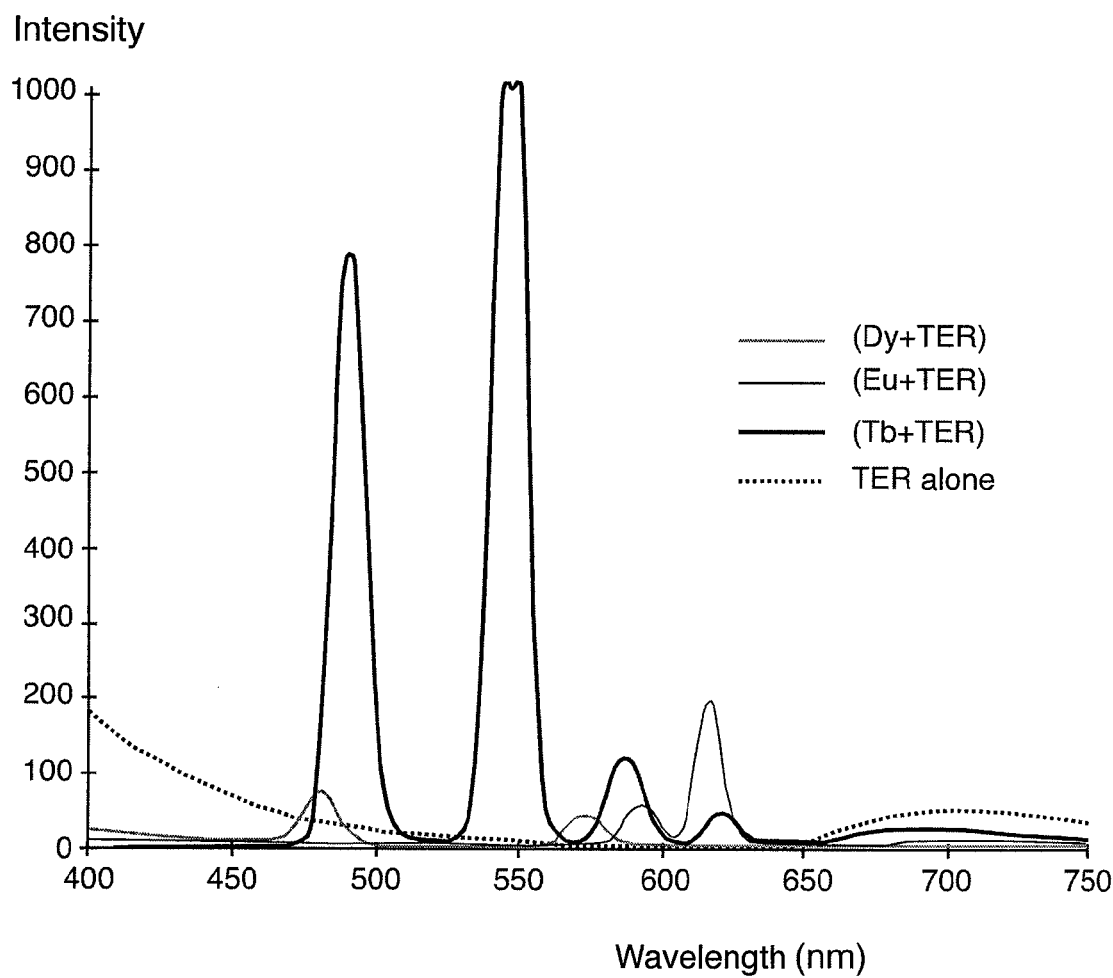
FIG. 1 shows the luminescence spectra of different monometallic crystallites obtained with a terephthalate ligand usable within the scope of the method and the materials according to the present invention.

The luminescence spectra observed with compounds according to the formula $Ln_2[TER]_3.4H_2O$ wherein Ln is either dysprosium, terbium or erbium are represented in FIG. 1.

The quantum yields (φ) of the compounds according to the formula $Ln_2[TER]_3.4H_2O$ wherein Ln is either europium, terbium, dysprosium, or terbium were determined for the solid samples using an integration sphere by means of M. Wrighton's method in table I below.

TABLE I

| Products | φ [%] |
|---|---|
| $Eu_2TER_3$ | (6.7 ± 0.9) |
| $Tb_2TER_3$ | (19.1 ± 1.0) |
| $Dy_2TER_3$ | (0.062 ± 0.004) |
| $Er_2TER_3$ | (0.022 ± 0.001) |

Compounds based on $Tb^{3+}$ or $Eu^{3+}$ ions have the most advantageous quantum yields for an industrial application.

According to similar procedures to those described above, compounds were also produced with other ligands, i.e.:

pyromellitate ion to obtain a compound according to the formula $Ln_2(PYRMA)_3.nH_2O$, wherein PYRMA represents a pyromellitate (benzene-1,2,4,5-tetracarboxylate) radical.

trimesate ion to obtain a compound according to the formula $Ln_2(TMA)_3.8.5H_2O$, wherein TMA represents a (benzene-1,3,5-tricarboxylate) radical.

Figure 2:
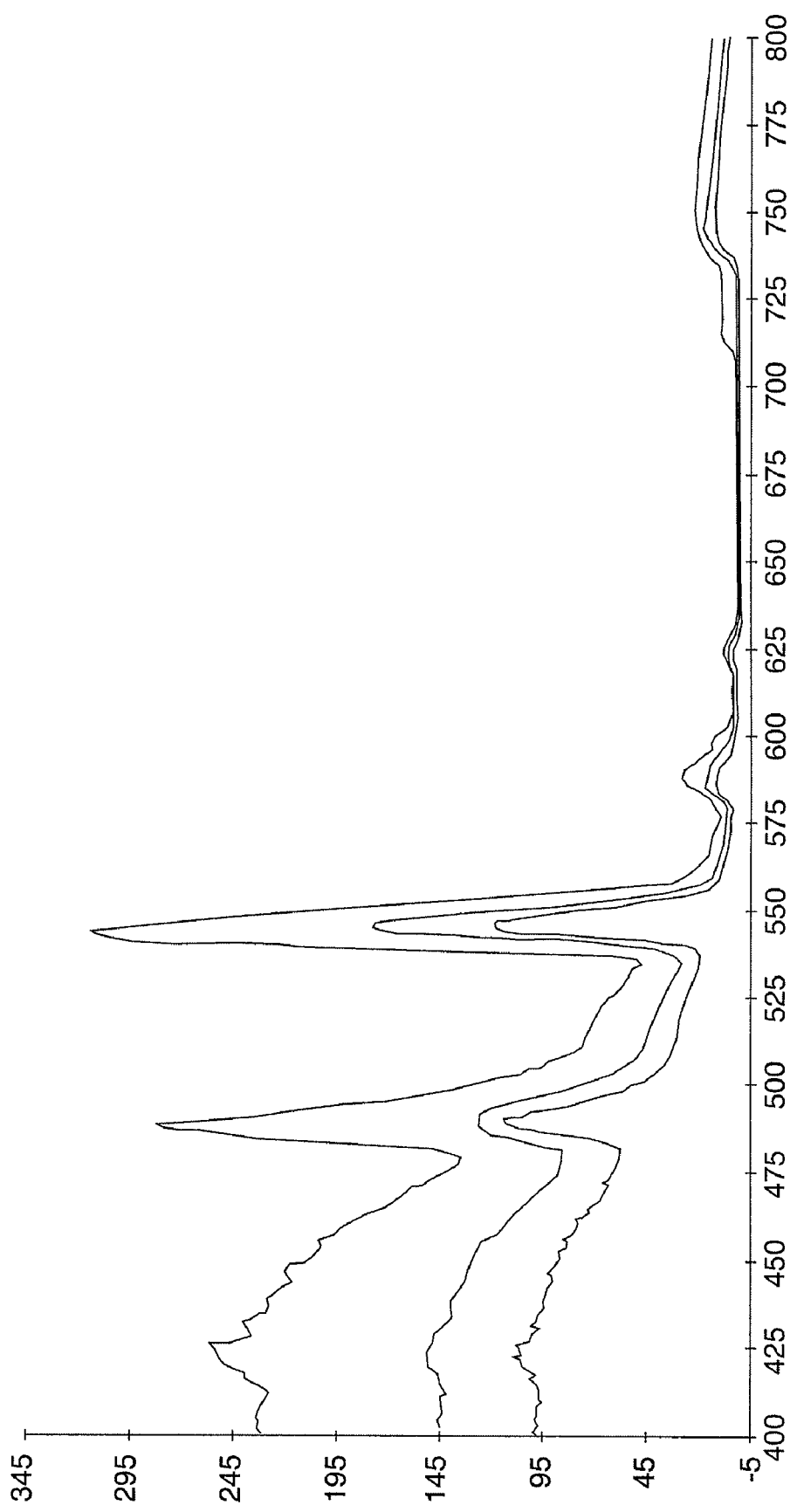
FIG. 2 shows the luminescence spectra of different monometallic crystallites obtained with terephthalate, pyromellitate and trimesate ligands.

These compounds have different emission spectra according to the ligands used as demonstrated in FIG. 2.

Finally, hetero-bi-metallic crystallites based on europium and terbium and terephthalate were also produced, having the general chemical formula:

$$Tb_xEu_y(C_8O_4H_4)_3(H_2O)_4 \text{ where } x+y=2$$

During the synthesis of said bimetallic compounds, a procedure similar to that described above for monometallic compounds was used, but varying the molar ratios of the lanthanide salts used in order to obtain crystallites displaying variable proportions of europium and terbium.

In view of the low concentrations wherein the crystallites are used within the scope of the method according to the invention, it was verified that each crystallite contains the same relative proportions of Tb and Eu as the global powder. Indeed, it is important for each crystallite to contain all the information. This was verified by means of micro-analysis using an SEM. The results of this analysis are given in table 2 below and clearly confirm that it is possible to manufacture powders wherein the relative proportions of Tb and Eu are perfectly controllable at the crystallite scale.

TABLE 2

| Molar percentages of starting solutions | | Crystallite analysis by means of scanning microscopy | |
|---|---|---|---|
| % Terbium | % Europium | % Terbium | % Europium |
| 10 | 90 | 12.56 | 87.44 |
| 20 | 80 | 20.36 | 79.64 |
| 30 | 70 | 28.35 | 71.65 |
| 40 | 60 | 39.11 | 60.89 |
| 50 | 50 | 50.58 | 49.42 |
| 60 | 40 | 60.22 | 39.78 |
| 80 | 20 | 80.56 | 19.44 |
| 90 | 10 | 89.83 | 10.17 |

Figure 3:
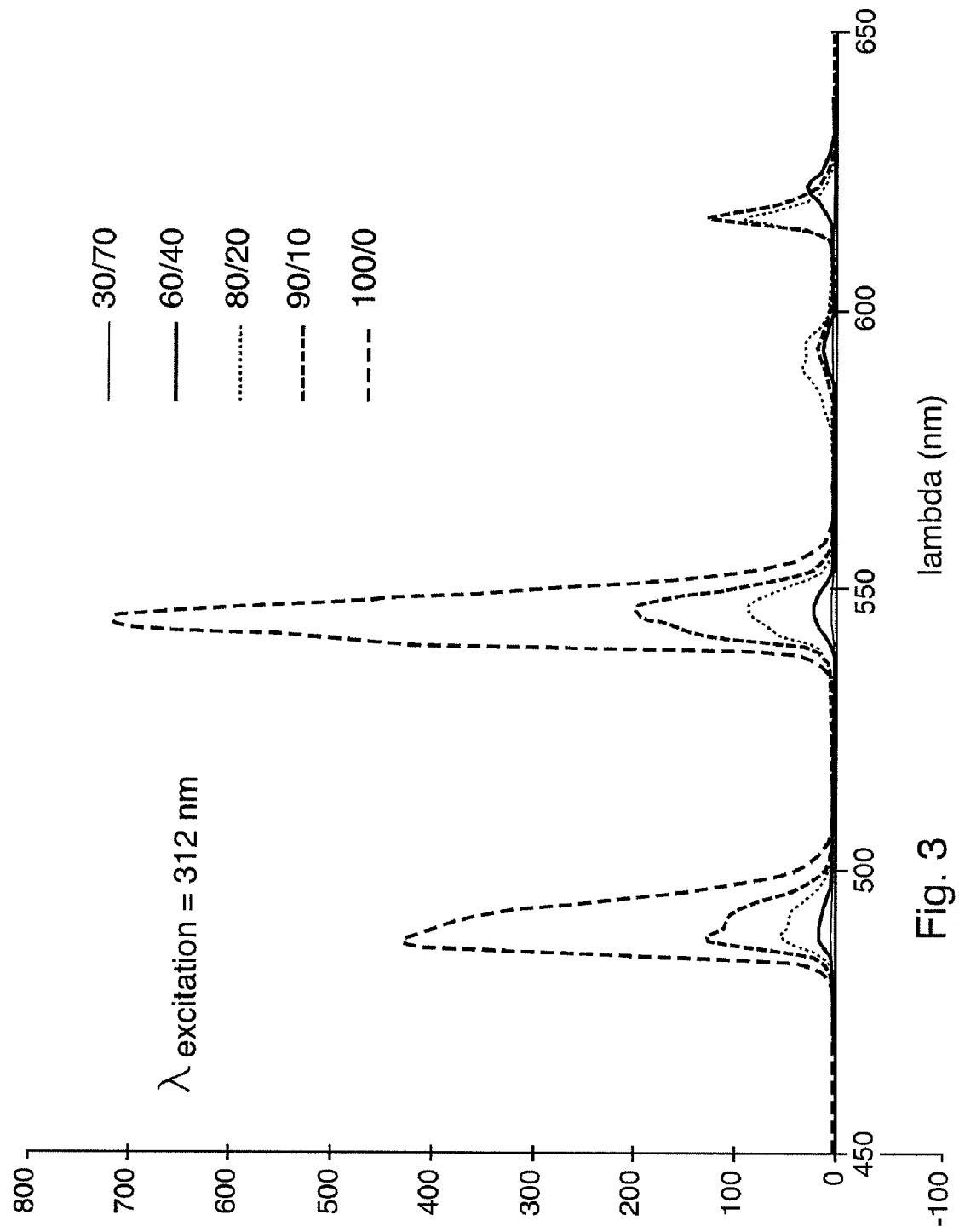
FIG. 3 shows luminescence spectra of difference bimetallic crystallites obtained within the scope of the method and materials according to the present invention.

As a function of the relative percentages of each of the rare earths in the crystallites, a chromatic variation is observed both with human eye and a fluorimeter. This is confirmed by FIG. 3 which shows fluorescence spectra obtained with these different compounds.

Materials Based on Mineral Matrices Incorporating the Lanthanide-based Compounds The compounds produced above were included, at different concentrations, in a mineral matrix, i.e. plaster. Indeed, plaster is a mineral matrix conventionally used in the production of materials, if the case arises with additives (setting retarding agent, setting accelerator, liquefier, colorant). The mixture of plaster and crystallite was then mixed. A mixing rate of 0.8 (proportion by mass of water/powder mixture) was used.

It was first verified that the compound is not altered during the mixing. For this purpose, dry plaster supplemented with 2.5% by weight of compound according to the formula $Tb_2TER_3.4H_2O$ was ground and analysed by means of X-ray diffraction on powder (in view of the precision of this technique, it was necessary to use a higher concentration than the concentration used in practice in the materials). The X-ray diffraction analysis demonstrated that the compound $Tb_2TER_3.4H_2O$ was indeed present after mixing and drying of the plaster.

The luminescence of the crystallites in the mineral matrix was then studied for different crystallite concentrations using a UV lamp emitting at 254 nm. The results are given in table 3 below.

TABLE 3

| | Luminescence observed with the human eye under UV irradiation (254 nm) | |
|---|---|---|
| Marker content by mass | Before mixing | After setting |
| 5% | Yes | Yes |
| 0.5% | Yes | Yes |
| 0.1% | Yes | Yes |
| 0.05% | Yes | Yes |
| 0.01% | Yes | Yes |
| 50 ppm | Yes | Yes |
| 10 ppm | Yes | Yes |
| 5 ppm | Yes | Yes |
| 1 ppm | Yes | Yes |
| 0.5 ppm | Yes | Yes |
| 0.1 ppm | No | Yes |
| 0.05 ppm | No | Yes |

These results, confirmed by fluorimetry analysis, indicate a visibility to the human eye of the marker in the material after mixing even at low contents by weight thereof in the matrix. This makes said compounds economically advantageous in spite of the relatively high cost thereof.

Tests of the luminescence of the marker according to the formula $Tb_2(C_8H_4O_4)_3.4H_2O$ according to the invention in another mineral matrix, i.e. KBr, were also conducted.

The compound was diluted in dry KBr at a rate of various concentrations ranging from 1 part of terbium-based compound per 10 parts of KBr to 1 part of terbium-based compound per 100,000 parts of KBr.

Figure 4:
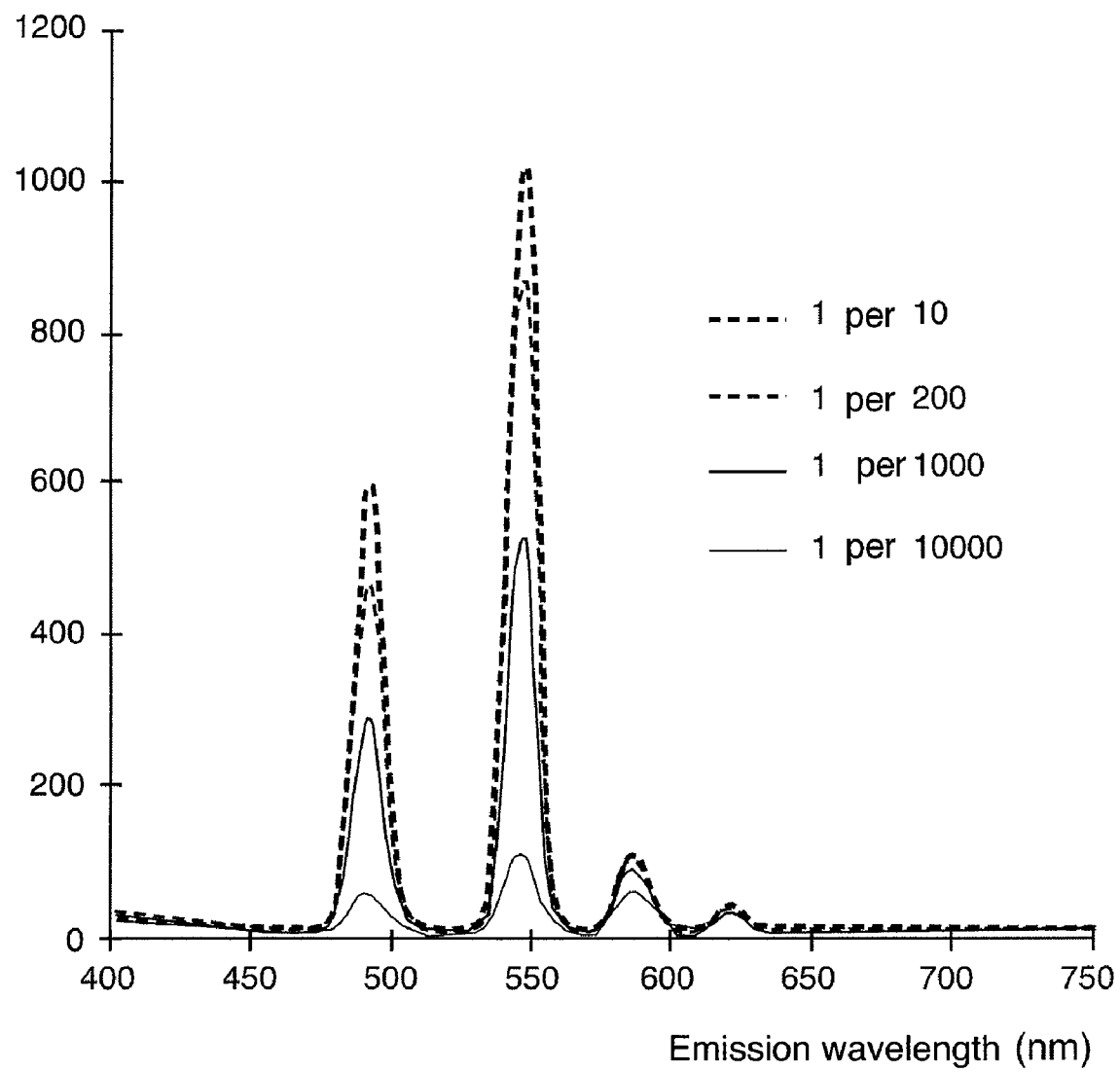
FIG. 4 shows the luminescence spectra of a terbium-based crystallite diluted at different concentrations in a mineral matrix (KBr).

The fluorimetry curves ($\lambda_{exc}$300 nm) corresponding to these various dilutions are given in the graph in FIG. 4.

Other tests were carried out with the crystallites according to the formula $Ln_2[PYRMA]_3.nH_2O$ and $Ln_2[TMA].8.5H_2O$. The results obtained are comparable to those obtained with the compounds produced using the terephthalate ligand.

Finally, other tests were carried out using hetero-bimetallic crystallites to label various batches of the same material.

The spectrophotometric analysis of the emission of these bimetallic compounds contained in these various batches demonstrates a variable response according to the relative lanthanide concentrations in the crystallites.

Such bimetallic compounds may be used to label different samples of the same material distinctively which is of particular interest in the labelling of different batches of the same material, in the labelling of said material according to the customer to whom it is sold, in the labelling of said material according to the date of manufacture thereof (year of manufacture), in the labelling of said material to detect copying thereof, etc.

The invention claimed is:

1. A method of labeling for identification a mineral matrix comprising mixing at least one luminescent lanthanide compound in an amount effective for ultraviolet radiation detection, wherein said compound is a coordination polymer in crystalline form made by reacting at least one luminescent lanthanide ion with at least one unsaturated organic ligand.

2. The labeling method according to claim 1, wherein the amount detectable for ultraviolet radiation is between 1 g/ton and 10 g/ton of mineral matrix.

3. The labeling method according to claim 2, characterised in that said compound based on luminescent lanthanide or luminescent rare earth is advantageously incorporated in said mineral matrix by successive dilutions.

4. The labeling method according to claim 1, characterised in that said material comprises at least one additive belonging to the following group:
  setting retarding agent;
  setting accelerator;
  liquefier;
  colorant,
  and in that it consists in incorporating said compound containing at least one luminescent lanthanide with at least one of said additives, and incorporating said mixture in said mineral matrix.

5. The labelling method according claim 1 for at least two samples of the same material comprising a mineral matrix characterised in that it comprises a step consisting in incorporating in each of said samples of said material during the manufacture or implementation thereof, a compound comprising at least two distinct lanthanides wherein at least one is luminescent according to a concentration making it detectable under ultraviolet irradiation, the lanthanide percentages of the compound being distinct according to said samples.

6. A material comprising a mineral matrix comprising at least one luminescent marker consisting of a compound comprising at least one luminescent lanthanide ion according to a concentration making said compound detectable under ultraviolet irradiation in said material, said compound being a coordination polymer in crystallite form obtained by reacting at least one luminescent lanthanide ion and at least one unsaturated organic ligand.

7. The material according to claim 6, wherein said lanthanide is europium, terbium, holmium, dysprosium, thulium, praseodymium, neodymium or erbium.

8. The material according to claim 6 or 7 wherein the compound comprises at least one first luminescent lanthanide and at least one second luminescent or non-luminescent lanthanide or yttrium.

9. The material according to claim 7 or 8 wherein said compound comprises europium and/or terbium.

10. The material according to claim 6 wherein the unsaturated ligand is selected from the group consisting of phthalate, isophthalate, terephthalate, trimesate, trimellitate, pyromellitate, or mellitate.

11. The material according to claim 10 wherein the unsaturated ligand is the terephthalate ion.

12. The material according to claim 11 wherein the compound complies with the formula:

$$Ln_xLn'_y(C_8O_4H_4)_3(H_2O)_4 \text{ where } x+y=2$$

wherein, Ln and Ln', identical or different, represent two luminescent lanthanide ions and $C_8O_4H_4$ a terephthalate radical.

13. The material according to claim 6 or 12, wherein the compound comprises at least one luminescent lanthanide in the amount of 1 to 10 g/ton.

14. The material according to claim 6, wherein the mineral matrix comprises calcium sulphate.

15. The material according to claim 6, wherein it comprises at least one additive selected from the group consisting of:
  setting retarding agent;
  setting accelerator;
  liquefier; or
  colorant.

16. The material according to claim 6, wherein it consists of a fireproofing material.

17. A method of labelling a material comprising a mineral matrix wherein it comprises at least one step consisting in incorporating therein during the manufacture thereof at least one compound based on at least one luminescent rare earth according to a concentration making said compound detectable under ultraviolet irradiation in said material, said compound being a coordination polymer in the form of a crystallite obtained by reacting at least one luminescent rare earth ion with at least one unsaturated organic ligand.

18. The material comprising a mineral matrix characterised in that it incorporates at least one luminescent marker consisting of a compound based on at least one rare earth ion according to a concentration making said compound detectable under ultraviolet irradiation in said material, said compound being a coordination polymer in the form of a crystallite obtained by reacting at least one luminescent rare earth ion and at least one unsaturated organic ligand.

* * * * *